US006200495B1

(12) United States Patent
Lund et al.

(10) Patent No.: US 6,200,495 B1
(45) Date of Patent: *Mar. 13, 2001

(54) PREMIX COMPOSITIONS OF POLYOL, BLOWING AGENT, AND OPTIONALLY ADDITIVES HAVING IMPROVED STORAGE STABILITY

(75) Inventors: Earl A. E. Lund, West Seneca; Robert G. Richard, Cheektowaga; Ian R. Shankland, Williamsville; David P. Wilson, E. Amherst, all of NY (US)

(73) Assignee: AlliedSignal Inc.

( * ) Notice: Subject to any disclaimer, the term of this patent is extended or adjusted under 35 U.S.C. 154(b) by 0 days.

This patent is subject to a terminal disclaimer.

(21) Appl. No.: 08/031,089

(22) Filed: Mar. 12, 1993

Related U.S. Application Data

(63) Continuation of application No. 07/946,830, filed on Sep. 17, 1992, now abandoned, which is a continuation of application No. 07/616,142, filed on Nov. 20, 1990, now abandoned, which is a continuation-in-part of application No. 07/251,730, filed on Oct. 3, 1988, now Pat. No. 4,986,930.

(51) Int. Cl.[7] .................................. C09K 3/00; C08J 9/14
(52) U.S. Cl. ...................................... 252/182.24; 521/131
(58) Field of Search ........................ 252/182.24; 521/131

(56) References Cited

U.S. PATENT DOCUMENTS

| | | | |
|---|---|---|---|
| 3,236,791 | 2/1966 | Cox ........................................ | 521/131 |
| 3,256,215 | 6/1966 | Desdons et al. ....................... | 521/131 |
| 3,644,168 | 2/1972 | Bonk et al. ............................ | 428/258 |
| 3,676,380 | 7/1972 | McLaughlin et al. ................. | 521/156 |
| 3,876,571 | 4/1975 | Cobbledick et al. .................. | 521/137 |
| 3,920,587 | 11/1975 | Watkinson ............................ | 521/111 |
| 4,018,724 | 4/1977 | Cobbledick ........................... | 521/121 |
| 4,060,439 | 11/1977 | Rosemund et al. ..................... | 156/78 |
| 4,299,924 | * 11/1981 | Nomura et al. ....................... | 521/131 |
| 4,439,549 | * 3/1984 | Brennan ................................ | 521/131 |
| 4,442,237 | * 4/1984 | Zimmerman et al. ................ | 521/131 |
| 4,442,238 | 4/1984 | Zimmerman et al. ................ | 521/164 |
| 4,444,915 | * 4/1984 | Grube et al. .......................... | 521/131 |
| 4,444,916 | 4/1984 | Grube et al. .......................... | 521/131 |
| 4,444,917 | * 4/1984 | Grube et al. .......................... | 521/131 |
| 4,452,920 | * 6/1984 | Joubert ................................. | 521/131 |
| 4,506,090 | * 3/1985 | Brennan et al. ...................... | 521/131 |
| 4,529,744 | * 7/1985 | Wood .................................... | 521/131 |
| 4,559,366 | * 12/1985 | Hostettler .............................. | 521/51 |
| 4,579,875 | * 4/1986 | Goel ............................. | 521/182.24 X |
| 4,699,932 | * 10/1987 | Fuzesi .................................. | 521/131 |
| 4,758,605 | 7/1988 | Williams .............................. | 521/129 |
| 4,927,863 | * 5/1990 | Bartlett et al. ........................ | 521/131 |
| 4,960,804 | * 10/1990 | Doerge ................................. | 521/131 |
| 4,986,930 | * 1/1991 | Lund et al. ..................... | 252/182.24 |
| 4,992,483 | * 2/1991 | Sylvester .............................. | 521/131 |
| 4,994,202 | * 2/1991 | Merchant ............................. | 252/171 |
| 5,026,497 | * 6/1991 | Merchant ............................. | 252/171 |
| 5,037,573 | * 8/1991 | Merchant ............................. | 252/171 |
| 5,137,929 | * 8/1992 | Demmin et al. ....................... | 521/99 |
| 5,169,995 | * 12/1992 | Crooker et al. ....................... | 570/111 |
| 5,169,996 | * 12/1992 | Crooker et al. ....................... | 570/121 |
| 5,169,997 | * 12/1992 | Crooker et al. ....................... | 570/121 |

FOREIGN PATENT DOCUMENTS

0392668 * 10/1990 (EP) .
0397378 * 11/1990 (EP) .
0401722 * 12/1990 (EP) .

OTHER PUBLICATIONS

Proceedings of the SPI 31st Annual Technical/Marketing Conference, Polyurethanes 88, Oct. 18–21, 1988 Philadelphia, PA.
"Blowing Agents, Suppliers Gear Technology for a bx;1CFC–Free Industry by 2000", Modern Plastics, pp. 99–103 (Sep. 1990).
Polyurethanes World Congress 1987, "The DuPont Program on Fluorocarbon Alternative Blowing Agents for Polyurethane Foams," Proceedings of the FSK/SPI, Sep. 29–Oct. 2, 1987.
Polyurethanes World Congress 1987, "Stability and Solubility of New Chlorofluorocarbon Blowing Agents in Polyurethane Systems", Proceedings of the FSK/SPI, Sep. 29–Oct. 2, 1987.
*Journal of Cellulular Plastics*, vol. 26, No. 2 published Apr. 1990 "A Performance Evaluation of Environmentally Accetable Foam Blowing Agents".*

* cited by examiner

*Primary Examiner*—Philip Tucker
(74) *Attorney, Agent, or Firm*—Jay P. Friedenson; Colleen D. Szuch

(57) ABSTRACT

Premixes of a polyol suitable for polyurethane or polyisocyanurate foam preparation, 1,1-dichloro-1-fluoroethane and optionally additives and/or auxiliary blowing agents which do not require a stabilizer to inhibit reaction between the fluorocarbon and the polyol. These mixtures are useful for polyurethane and polyisocyanurate foam preparation.

61 Claims, No Drawings

PREMIX COMPOSITIONS OF POLYOL, BLOWING AGENT, AND OPTIONALLY ADDITIVES HAVING IMPROVED STORAGE STABILITY

This application is a continuation of application Ser. No. 07/946,830 filed Sep. 17, 1992, now abandoned which is a continuation of application Ser. No. 07/616,142, filed Nov. 20, 1990 now abandoned which is a continuation-in-part of application Ser. No. 251,730, filed Oct. 3, 1988 now U.S. Pat. No. 4,986,930.

FIELD OF THE INVENTION

This invention relates to improved polyurethane and polyisocyanurate foam systems which eliminate the need for stabilizers used in the past with certain chlorofluorocarbon blowing agents. The improvement stems from the discovery that use of 1,1-dichloro-1-fluoroethane ($CCl_2FCH_3$) as the blowing agent provides enhanced chemical stability when the blowing agent is stored as a pre-mix, i.e. blowing agent pre-blended with certain other components used in polyurethane-type foam manufacture, such as polyols.

BACKGROUND OF THE INVENTION

It is well known to those skilled in the art that polyurethane and polyisocyanurate foams can be prepared by reacting and foaming a mixture of ingredients, consisting in general of an organic polyisocyanate (including diisocyanate) and an appropriate amount of polyol or mixture of polyols in the presence of a volatile liquid blowing agent, which is caused to vaporize by the heat liberated during the reaction of isocyanate and polyol. It is also well known that this reaction and foaming process can be enhanced through use of amine and/or tin catalysts as well as surfactants. The catalysts ensure adequate curing of the foam while the surfactants regulate and control cell size.

In the class of foams known as low density rigid polyurethane or polyisocyanurate foam the blowing agent of choice has been trichlorofluoromethane, $CCl_3F$, also known as CFC-11. These types of foams are closed-cell foams in which the CFC-11 vapor is encapsulated or trapped in the matrix of closed cells. They offer excellent thermal insulation, due in part to the very low thermal conductivity of CFC-11 vapor, and are used widely in insulation applications, e.g. roofing systems, building panels, refrigerators and freezers. Generally, 1–40 and typically, 15–40 parts of blowing agent per 100 parts polyol are used in rigid polyurethane or polyisocyanurate formulations.

Flexible polyurethane foams on the other hand are generally open-cell foams and are manufactured using a diisocyanate and polyol along with catalysts and other additives with various combinations of water, methylene chloride and CFC-11 as the blowing agent. These foams are widely used as cushioning materials in items such as furniture, bedding and automobile seats. The quantity of CFC-11 used as an auxillary blowing agent in flexible foam manufacture varies from 1–30 parts by weight per 100 parts of polyol according to the grade of foam being prepared.

It is common practice in the urethane foam systems area to prepare so-called pre-mixes of certain components used to prepare the foam, i.e. often the appropriate quantities of polyol, blowing agent, surfactant, catalyst, flame retardant and other additives, are blended together and sold along with the stoichiometric quantity of polyisocyanate component in two separate containers. This is convenient for the end user who then only has to combine the two reactants in order to create a foam.

It is also common practice for large foam manufacturing plants to pre-mix the polyol with the blowing agent in bulk storage containers. This liquid mixture possesses a lower viscosity than the pure polyol and is therefore easier to pump and meter into the mixing zone of the foam manufacturing equipment.

Special precautions must be taken when following these practices if the blowing agent is CFC-11, namely, the CFC-11 must have a stabilizer added to it in order to inhibit a reaction which can occur between the fluorocarbon and the polyol resulting in the production of acids such as hydrogen chloride and other organic products such as aldehydes and ketones. These reaction products have a detrimental effect on the reactivity characteristics of the foam ingredients which in the worst case results in no foaming action at all. Stabilizers found useful in stopping the reaction between fluorocarbon and polyol have been disclosed, for example, in U.S. Pat. Nos. 3,183,192 and 3,352,789. Use of such stabilizers with CFC-11/polyol based blends, although successful when measured in terms of fluorocarbon stability, have disadvantages such as added expense and sometimes cause odor problems which persist even in the finished foam.

For the above reasons, it would be advantageous to identify useful fluorocarbon blowing agents which do not require stabilizers in the presence of polyols. Unfortunately, there does not appear to be any reliable scientific basis upon which to predict such stability. The propensity for a fluorocarbon species to react with an OH containing species, like a polyol, is dependent, in the fundamental sense, on the electronic and molecular structures of the fluorocarbon and the OH species involved. Studies of certain reactant systems, such as CFC-11 and ethanol by P. H. Witjens, *Aerosol Age* Vol. 4, No. 12 (Dec., 1959), P. A. Sanders "Mechanisms of the Reaction Between Trichlorofluoromethane and Ethyl Alcohol", *Proc. of the CSMA 46th Mid-Year Meeting,* (May 1960), and J. M. Church and J. H. Mayer, *J. of Chem. and Eng. Data,* Vol. 6, No. 3 (Jul., 1961), have shown that the reaction products include hydrochloric acid, acetaldehyde and $CHCl_2F$. Sanders, in *Soap and Chemical Specialties,* (Dec., 1965) has shown that these reactions are further promoted by the presence of metal and water.

H. M. Parmelee and R. C. Downing in *Soap Sanitory Chemicals,* Vol. 26, pp. 114–119 (Jul., 1950) have shown that fluorocarbons such as chlorodifluoromethane (FC-22), 1,1-difluoroethane (FC-152a), 1,1,1-chlorodifluoroethane (FC-142b) and 1,1,2,2-tetrafluoro-1,2-dichloroethane (FC-114) undergo reactions in aqueous and ethanol and isopropanol solutions in the presence of steel and aluminum. Church and Mayer, supra, state that mixed polyhalogenated hydrocarbons containing both chlorine and fluorine on the same carbon atom are less stable than the polyfluoro derivatives.

The molecular structure of HCFC-141b ($CCl_2FCH_3$) suggests that HCFC-141b is amenable to dehydrochlorination due to the presence of hydrogen and chlorine atoms on adjacent carbon atoms. On the other hand HCFC-123 ($CHCl_2CF_3$) is amenable to dehydrofluorination, a process requiring a greater activation energy. Therefore it would be expected that HCFC-141b would be less stable than HCFC-123.

The prior art evidence therefore suggests that chlorine and fluorine substituted hydrocarbons as a class react with organic OH containing species such as alcohols and polyols.

U.S. Pat. No. 4,076,644 discloses that HCFC-123 may be used as a blowing agent and does not require a stabilizer in the presence of polyols. Thus, HCFC-123 may be an exception to the rule that fluorocarbons require stabilizers.

However, stability tests on HCFC-123 in the presence of a variety of polyols show that HCFC-123 may not be stable in the presence of some polyols which are commonly used in the preparation of polyurethane and polyisocyanurate foams.

It is accordingly an object of this invention to identify another fluorocarbon useful as a blowing agent for polyurethane and polyisocyanurate foams which is stable in the presence of polyols and optionally additives and auxiliary blowing agents.

It is another object of this invention to identify such a fluorocarbon which is also considered to be a stratospherically safe substitute for CFC-11 which is thought to be a contributor to ozone depletion and global greenhouse warming.

Yet another object of the invention is to identify such a fluorocarbon which may have a wider or at least different range of applicability to polyols than does HCFC-123.

Other objects and advantages of the invention will be apparent from the following description.

SUMMARY OF THE INVENTION

The invention comprises premixes of a polyol suitable for polyurethane or polyisocyanurate foam preparation, 1,1-dichloro-1-fluoroethane and optionally additives and/or auxillary blowing agents in proportions suitable for polyurethane or polyisocyanurate foam preparation.

DETAILED DESCRIPTION OF THE INVENTION

HCFC-141b is a known material and can be prepared by methods known to the art such as disclosed in U.S. Pat. No. 3,833,676.

In accordance with the invention, HCFC-141b may be used as described in the background portion of this description to prepare a variety of polyurethane and polyisocyanurate foams by standard techniques known to the art which may include the use of various auxiliary blowing agents and standard additives such as catalysts, surfactants, water and others.

The amount of HCFC-141b relative to the amount of polyol employed will vary depending upon the application, the type of foam being prepared, the identity of the polyol and other factors, but can readily be determined by anyone skilled in the art. Generally, from about 1 to 40 parts by weight of HCFC-141b per 100 parts by weight of polyol are employed, but preferably about 15 to 40 parts by weight of HCFC-141b per 100 parts by weight of polyol are used in rigid foam manufacture and about 1–30 parts by weight of HCFC-141b per 100 parts by weight of polyol are used in flexible foam manufacture.

For purposes of this application, the term "storage stable premixes" shall refer to premixes which have been stored for at least 30 days prior to use without any substantial deleterious effect on the reactivity characteristics of the foam ingredients. For purposes of this definition, "substantial deleterious effect on the reactivity characteristics of the foam ingredients" shall mean that the reactivity of the foam ingredients decreases such that it produces a 10% increase in any of the following: cream time, gel time and rise time.

This invention is further illustrated by the following examples in which parts or percentages are by weight unless otherwise specified.

EXAMPLES A

In this set of examples the stability of HCFC-141b with the various polyols listed in Table I is determined and compared with the stability of CFC-11 and HCFC-123 with the same polyols. The polyols selected are some of the most common polyols used in the commercial foam industry. The fluorocarbon/polyol mixtures simulate commercial foam formulations. Note that the flash points reported were determined using the following flash point methods: Pensky-Marten Cup Test for the PLURACOL® polyols; Cleveland Open Cup for the TERATE®, CHARDOL®, POLY-G® and NIAX® polyols; SETA Flash Closed Cup for the STEPANOL® polyol; TAG Closed Cup for the PHT4 diol; and Pensky-Marten Closed Cup for the THANOL® and VORANOL® polyols.

TABLE I

| Polyol | OH Number | Viscosity 25° C. (cp) | Water Content (%) | Density (lb./gal.) | Flash Point |
|---|---|---|---|---|---|
| PLURACOL® 975[1] | 400 | 4,500 | 0.05 Max | 9.08 @ 25 C. | >200° F. |
| PLURACOL® 824[2] | 390 | 10,500 | 0.05 Max | 9.09 @ 25 C. | 200° F. |
| PLURACOL® 1114[3] | — | 14,000 | — | 9.24 | 200° F. |
| TERATE® 203[4] | 316 | 20,585 | Not Detected | 1.2 (typ)* | 156° C. |
| STEPANOL® PS-2502A[5] | 230–250 | 2,000–4,000 | 0.15 Max | 10.0 @ 25° C. | 200° F. |
| CHARDOL® 336A[6] | 235 | 5,400 | 0.08 (typ) | 1.18 (typ)* | 250° C. |
| THANOL® R-350-X[7] | 520–540 | 12,000–17,000 | 0.1 Max | 1.12 @ 25° C.* | 300° F. |
| THANOL® 650-X[8] | 440–460 | 22,000 | 0.10 | 1.06 @ 20° C. | 305° F. |
| POLY-G® 71-357[9] | 350 | 2,500 | 0.08 Max | 9.2 @ 25° C. | 356° F. |
| POLY-G® 75-442[10] | 440 | 5,000 | 0.05 | 9.2 @ 25° C. | 204° C. |
| NIAX® | 700 | 100,000 | 0.1 Max | 1.05 @ 20 C.* | 455° F. |

TABLE I-continued

| Polyol | OH Number | Viscosity 25° C. (cp) | Water Content (%) | Density (lb./gal.) | Flash Point |
|---|---|---|---|---|---|
| LA-700[11] PHT4-DIOL[12] | 220–235 | 90,000 | 0.1 (typ) | 1.8 @ 25° C.** | 200° F. |
| VORANOL ® 370[13] | 370 | 23,000 | 0.1 Max | 1.11 @ 25° C. | 335° F. |
| VORANOL ® 800[14] | 800 | 17,300 | 0.10 | 8.75 @ 25° C. | 405° F. |
| FOAMOL ® 35000[15] | 302 | 28.4000 | 0.13 | 1.2 @ 25° C.* | 145° C. |

*indicates specific gravity
[1]PLURACOL ® is a trademark of BASF Inc. PLURACOL ® polyol 975 is a sucrose-based polyether polyol.
[2]PLURACOL ® is a trademark of BASF Inc. PLURACOL ® polyol 824 is an aromatic initiator-based polyether polyol.
[3]PLURACOL ® is a trademark of BASF Inc. PLURACOL ® polyol 1114 is a polyether polyol/polyester polyol blend
[4]TERATE ® is a trademark of Cape Industries. TERATE ® 203 is an aromatic-based polyester polyol.
[5]STEPANOL ® is a trademark of Stepan Company. STEPANOL ® PS-2502-A is an aromatic-based polyester polyol.
[6]CHARDOL ® is a trademark of Cook Composites and Polymers CHARDOL ® 336-A is a polyethylene terephthalate-based polyester polyol.
**indicates density (g/ml)
[7]THANOL ® is a trademark of ARCO Chemical Co. THANOL ® R-350-X is an aromatic amine-based polyether polyol.
[8]THANOL ® is a trademark of ARCO Chemical Co. THANOL ® 650-X is a rigid polyol***.
[9]POLY-G ® is a trademark of Olin Corporation. POLY-G ® 71-357 is a sucrose-amine based polyether polyol.
[10]POLY-G ® is a trademark of Olin Corporation. POLY-G ® 75-442 is a methyl glucoside-based polyol.
[11]NIAX ® is a trademark of Union Carbide Corp. NIAX ® polyol LA-700 refers is an amine-based polyether polyol.
[12]PHT4-DIOL is a reactive brominated diol manufactured by Great Lakes Chemical Corp.
***The term "rigid polyol" refers to polyols which are used to make rigid polyurethane or polyisocyanurate foam.
[13]VORANOL ® is a trademark of Dow Chemical Corp. VORANOL ® 370 is a sucrose-based polyether polyol.
[14]VORANOL ® is a trademark of Dow Chemical Corp. VORANOL ® 800 is an amine-based polyether polyol.
[15]FOAMOL ® is a trademark of Jim Walter Resources, Inc. FOAMOL ® 3500 is an aromatic polyester polyol.

The apparent pH of each blend is determined by mixing 20 cm$^3$ of the fluorocarbon blend with 80 cm$^3$ of 0.1 Normal KCl solution made up in 3:1 methanol:water and then measuring the pH of the final solution with a calibrated pH meter. This type of measurement is believed to be accurate to within 0.1 pH unit.

After measuring the initial pH of the mixtures, they are deposited in sealed glass tubes and placed in an oven controlled at 54° C.± about 0.5° C. for a 12 week period. At the end of this period, the pH of the mixtures is again measured. The results indicate that the HCFC-141b/polyol mixtures are significantly more stable than those of CFC-11 or HCFC-123. Specifically, the reduction in pH is significantly less in the HCFC-141b/polyol mixtures than in those mixtures employing CFC-11 and HCFC-123.

EXAMPLES B

This set of examples further confirms the enhanced stability of HCFC-141b/polyol blends over CFC-11/polyol blends and HCFC-123/polyol blends using a different measure of the acidity change and a more real-life storage technique.

Polyol/blowing agent blends are prepared using the polyols listed in Table I above at a 30 weight percent blowing agent composition. These compositions are stored in closed, unlined tin-plated steel cans for 10 weeks at 54° C. At the end of the aging period, a sample of the mixture is diluted with ethanol and titrated against a standard solution of KOH in ethanol to a pH-9.5 endpoint. The amount of KOH used is then compared with the amount of KOH required to neutralize the un-aged polyol. The results indicates that HCFC-141b results in substantially smaller acid generation (i.e., the HCFC-141b containing mixture requires less KOH than do mixtures containing CFC-11 or HCFC-123) in all cases relative to CFC-11 and HCFC-123 indicating it is more stable in the presence of polyols than either CFC-11 or HCFC-123.

Often polyol/blowing agent premixes contain additives like surfactants, catalysts and emulsifiers. For example, rigid urethane foam formulations may contain silicone surfactants like DC-193, a siloxane, manufactured by Air Products & Chemicals Inc. of Allentown, Pa., B8404, a polyether modified polysiloxane manufactured by Goldschmidt Chemical Corp. of Hopewell, Va. and L5420 a polyalkylenoxide methyl siloxane manufactured by Union Carbide Chemicals, & Plastics Co., Inc., Specialty Chemicals Division of Danbury, Conn. A surfactant has two functions: it may act as a cell regulator, controlling cell nucleation and cell size; it can also act as an emulsifier. In this second capacity, the surfactant allows incompatible materials to be blended into a homogenous batch.

Amine catalysts may also be added to the premixes. Some typical amine catalysts include dimethyl ethanol amine, DABCO 33LV® which is a 33% solution of triethylenediamine in dipropylene glycol and POLYCAT® 8, which is N,N-dimethylcyclohexylamine. DABCO 33LV® and POLYCAT® 8 are manufactured by Air Products & Chemicals Inc.* Amine catalysts control the rate of the urethane reaction.

*DABCO 33-LV® and POLYCAT® 8 are registered trademarks of Air Products & Chemicals Inc.

Metallic catalysts may also be included in rigid urethane foam formulations. T-12 or dibutyltin dilaurate manufactured by Air Products & Chemicals

| Typical properties: | DABCO 33-LV ® | POLYCAT ® |
|---|---|---|
| Specific gravity: | 1.03 @ 24° C. | 0.8512 @ 20° C. |
| Boiling Point (° C.): | 174 | 160 @ 756 mmHg |
| Vapor pressure @ 38° C.: | 2 mmHg | 9.77 mmHg |
| Appearance: | clear, colorless liqu. | colorless-to-straw liquid |
| Flash point: | >110° C. (PMCC) | 40° C. (ASTM D56-70) (CC) |

Inc. and lead naphthanate are typical metallic catalysts. Metallic catalysts greatly increase the rate of the urethane polymerization. Metallic catalysts are necessary, for example, in spray foams where very short reaction times are required.

Premixes often contain at least one auxiliary blowing agent. The premix compositions in accordance with the invention may contain at least one auxiliary blowing agent. The auxiliary blowing agent used in these premixes may be, for example, a fluorocarbon, an organic liquid, water or any combination of the above.

Auxillary blowing agents are used in combination with a primary blowing agent for a variety of reasons. For example, water is sometimes employed as an auxillary blowing agent to help reduce the consumption of the primary blowing agent. Water also produces improved strength properties in rigid foam. Other materials including CFC's, HFC's, HCFC's and organic liquids have also been used as auxiliary blowing agents with HCFC-141b, for example, to reduce consumption of HCFC-141b, reduce foam costs, improve foam properties and/or improve foam processing. Some of the most common CFC's, HFC's, HCFC's and organic liquids employed as auxiliary blowing agents include trichlorofluoromethane (CFC-11), dichlorodifluoromethane (CFC-12), methylene fluoride (HFC-32), pentafluoroethane (HFC-125), 1,1,1,2-tetrafluoroethane (HFC-134a), chlorodifluoromethane (HCFC-22), 1,1-dichloro-2,2,2-trifluoroethane (HCFC-123), 1,2-dichloro-2,2,2-trifluoroethane (HCFC-123a), 1-chloro-1,2,2,2-tetrafluoroethane (HCFC-124), methyl formate and methylene chloride.

In premix compositions utilizing a fluorocarbon or organic liquid as auxiliary blowing agent in conjuction with HCFC-141b, HCFC-141b generally comprises greater than 50 percent of the total amount of blowing agent used. In another embodiment utilizing a fluorocarbon or organic liquid as auxiliary blowing agent in conjuction with HCFC-141b in a premix composition, the HCFC-141b comprises greater than 70 percent of the total amount of blowing agent used. In yet another embodiment utilizing a fluorocarbon or organic liquid as auxiliary blowing agent in conjuction with HCFC-141b in a premix composition, the HCFC-141b comprises greater than 50 and less than 70 percent of the total amount of blowing agent used.

In premix compositions utilizing water as the auxiliary blowing agent in conjunction with HCFC-141b, water generally comprises up to 2 parts by weight per 100 parts by weight of polyol used in the foam formulation.

In a preferred embodiment, in premix compositions utilizing water as an auxiliary blowing agent in conjunction with HCFC-141b, water generally comprises up to 1 part by weight per 100 parts by weight of polyol used in the foam formulation.

In this next set of Examples the stability of HCFC-141b-auxillary blowing agent/polyol blends are compared with blends utilizing CFC-11 and HCFC-123 with the same auxiliary blowing agents and polyols. The results confirm that blends utilizing HCFC-141b are substantially more stable than blends utilizing CFC-11 or HCFC-123.

EXAMPLES C

All possible blends of the polyols listed in Table I above with the auxiliary blowing agents listed in Table III below with each of HCFC-141b, CFC-11 and HCFC-123 are prepared and the stability of each blend is determined by repeating the experiment outlined in Examples A above. The results indicate that the HCFC-141b-auxillary blowing agent/polyol mixtures are significantly more stable than those of CFC-11 or HCFC-123. Specifically, the reduction in pH is significantly less in the HCFC-141b-auxillary blowing agent/polyol mixtures than in those mixtures employing CFC-11 or HCFC-123.

TABLE III $H_2O$
Trichlorofluoromethane (CFC-11)
Dichlorodifluoromethane (CFC-12)
Methylene fluoride (HFC-32)
Pentafluoroethane (HFC-125)
1,1,1,2-tetrafluoro-
ethane (HFC-134a)
Chlorodifluoromethane (HCFC-22)
1,1-dichloro-2,2,2-tri-
fluoroethane (HCFC-123)
1,2-dichloro-1,2,2-tri-
fluoroethane (HCFC-123a)
1-chloro-1,2,2,2-tetra-
fluoroethane (HCFC-124)
Methyl Formate
Methylene chloride

EXAMPLES D

All possible blends of the polyols and auxiliary blowing agents listed in Tables I and III respectively with each of HCFC-141b, CFC-11 and HCFC-123 are prepared and the stability of each blend is determined by repeating the experiment outlined in Examples B above. The results indicate that the compositions employing HCFC-141b result in substantially smaller acid generation in all cases relative to CFC-11 and HCFC-123 indicating that HCFC-141b is more stable than CFC-11 and HCFC-123 in the tested compositions.

What is claimed is:

1. Storage stable premixes for foam manufacture comprising a polyether polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

2. Storage stable premixes for foam manufacture comprising a polyester polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

3. Storage stable premixes for foam manufacture comprising a rigid polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

4. Storage stable premixes for foam manufacture comprising a polyether polyol/polyester polyol blend and 1,1-dichloro-1-fluoroethane in which no reaction occurs between the 1,1,-dichloro1-fluoroethane and polyol which has a substantial deleterious effect on the reactivity characteristics of the foam ingredients in proportions suitable for polyurethane or polyisocyanurate foam preparation.

5. Storage stable premixes for foam manufacture comprising a methyl glucoside-based polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

6. Storage stable premixes for foam manufacture comprising a reactive brominated diol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

7. The premixes of claim 1 wherein said polyol is a sucrose-based polyether polyol.

8. The premixes of claim 1 wherein said polyol is a sucrose amine-based polyether polyol.

9. The premises of claim 1 wherein said polyol is an aromatic amine-based polyether polyol.

10. The premixes of claim 1 wherein said polyol is an aromatic initiator-based polyether polyol.

11. The premixes of claim 1 wherein said polyol is an amine-based polyether polyol.

12. The premixes of claim 2 wherein said polyol is an aromatic-based polyester polyol.

13. The premixes of claim 2 wherein said polyol is a polyethylene terephthalate-based polyester polyol.

14. The premixes of claim 1 wherein said premixes additionally contain at least one auxiliary blowing agent.

15. The premixes of claim 2 wherein said premixes additionally contain at least one auxiliary blowing agent.

16. The premixes of claim 14 wherein said auxiliary blowing agent is a fluorocarbon.

17. The premixes of claim 15 wherein said auxiliary blowing agent is a fluorocarbon.

18. The premixes of claim 14 wherein said auxiliary blowing agent is water.

19. The premixes of claim 15 wherein said auxiliary blowing agent is water.

20. The premixes of claim 18 wherein water comprises up to 2 parts by weight per 100 parts by weight of polyol.

21. The premixes of claim 18 wherein water comprises up to 1 part by weight per 100 parts by weight of polyol.

22. The premixes of claim 19 wherein water comprises up to 2 part by weight per 100 parts by weight of polyol.

23. The premixes of claim 19 wherein water comprises up to 1 parts by weight per 100 parts by weight of polyol.

24. The premixes of claim 16 wherein said auxillary blowing agent is selected from the group consisting of trichlorofluoromethane, dichlorodifluoromethane, methylene fluoride, pentafluoroethane, 1,1,1,2-tetrafluoroethane, chlorodifluoromethane, 1,1-dichloro-2,2,2-trifluoroethane, 1,2-dichloro-1,2,2-trifluoroethane, 1-chloro-1,2,2,2-tetrafluoroethane and mixtures thereof.

25. The premixes of claim 17 wherein said auxiliary blowing agent is selected from the group consisting of trichlorofluoromethane, dichlorodifluoromethane, methylene fluoride, pentafluoroethane, 1,1,1,2-tetrafluoroethane, chlorodifluoromethane, 1,1-dichloro-2,2,2-trifluoroethane, 1,2-dichloro-1,2,2-trifluoroethane, 1-chloro-1,2,2,2-tetrafluoroethane and mixtures thereof.

26. The premixes of claim 16 wherein said 1,1-dichloro-1-fluoroethane comprises greater than 50 percent of the total amount of blowing agent used.

27. The premixes of claim 17 wherein said 1,1-dichloro-1-fluoroethane comprises greater than 50 percent of the total amount of blowing agent used.

28. The premixes of claim 16 wherein said 1,1-dichloro-1-fluoroethane comprises greater than 70 percent of the total amount of blowing agent used.

29. The premixes of claim 17 wherein said 1,1-dichloro-1-fluoroethane comprises greater than 70 percent of the total amount of blowing agent used.

30. The premixes of claim 16 wherein said 1,1-dichloro-1-fluoroethane comprises greater than 50 and less than 70 percent of the total amount of blowing agent used.

31. The premixes of claim 19 wherein said 1,1-dichloro-1-fluoroethane comprises greater than 50 and less than 70 percent of the total amount of blowing agent used.

32. The premixes of claim 24 wherein said auxiliary blowing agent is chlorodifluoromethane.

33. The premixes of claim 24 wherein said auxiliary blowing agent is 1,1-dichloro-2,2,2-trifluoroethane.

34. The premixes of claim 25 wherein said auxillary blowing agent is chlorodifluoromethane.

35. The premixes of claim 25 wherein said auxiliary blowing agent is 1,1-dichloro-2,2,2-trifluoroethane.

36. Premixes for foam manufacture comprising a polyether polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

37. Premixes for foam manufacture comprising a polyester polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

38. Premixes for foam manufacture comprising a rigid polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

39. Premixes for foam manufacture comprising a polyether polyol/polyester polyol blend and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

40. Premixes for foam manufacture comprising a methyl glucoside-based polyol and 1,1-dichloro-1-fluoroethane in which no reaction occurs between the 1,1-dichloro-1- fluoroethane and polyol which has a substantial deleterious effect on the reactivity characteristics of the foam ingredients in proportions suitable for polyurethane or polyisocyanurate foam preparation.

41. Premixes for foam manufacture comprising a reactive brominated diol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate foam preparation.

42. The premixes of claim 36 wherein said polyol is a sucrose-based polyether polyol.

43. The premixes of claim 36 wherein said polyol is a sucrose amine-based polyether polyol.

44. The premixes of claim 36 wherein said polyol is an aromatic amine-based polyether polyol.

45. The premixes of claim 36 wherein said polyol is an aromatic initiator-based polyether polyol.

46. The premixes of claim 36 wherein said polyol is an amine-based polyether polyol.

47. The premixes of claim 37 wherein said polyol is an aromatic-based polyester polyol.

48. The premixes of claim 39 wherein said polyol is a polyethylene terephthalate-based polyester polyol.

49. The premixes for foam manufacture of claim 36 wherein said premixes comprise a polyether polyol and 1,1-dichloro-1-fluoroethane in which no reaction occurs between the 1,1-dichloro-1-fluoroethane and polyol which has a substantial deleterious effect on the reactivity characteristics of the foam ingredients in proportions suitable for polyurethane or polyisocyanurate loam preparation wherein said 1,1-dichloro-1-fluoroethane is the only blowing agent used in the foam preparation.

50. The premixes of claim 37 wherein said premixes comprise a polyester polyol and 1,1-dichloro-1-fluoroethane in proportions suitable for polyurethane or polyisocyanurate foam preparation wherein said 1,1-dichloro-1-fluoroethane is the only blowing agent used in the foam preparation.

51. The premixes of claim 38 wherein said premixes comprise a rigid polyol and 1,1-dichloro-1-fluoroethane in proportions suitable for polyurethane or polyisocyanurate foam preparation wherein said 1,1-dichloro-1-fluoroethane is the only blowing agent used in the foam preparation.

52. The premixes of claim 39 wherein said premixes comprise a polyether polyol/polyester polyol blend and 1,1-dichloro-1-fluoroethane in proportions suitable for polyurethane or polyisocyanurate foam preparation wherein said 1,1-dichloro-1-fluoroethane is the only blowing agent used in the foam preparation.

53. The premixes of claim 40 wherein said premixes comprise a methyl glucoside-based polyol and 1,1-dichloro-1-fluoroethane in proportions suitable for polyurethane or polyisocyanurate foam preparation wherein said 1,1-dichloro-1-fluoroethane is the only blowing agent used in the foam preparation.

54. The premixes of claim 41 wherein said premixes comprise a reactive brominated diol and 1,1-dichloro-1-fluoroethane in proportions suitable for polyurethane or polyisocyanurate foam preparation wherein said 1,1-dichloro-1-fluoroethane is the only blowing agent used in the foam preparation.

55. The premixes of claim 49 wherein said polyol is a sucrose-based polyether polyol.

56. The premixes of claim 49 wherein said polyol is a sucrose amine-based polyether polyol.

57. The premixes of claim 49 wherein said polyol is an aromatic amine-based polyether polyol.

58. The premixes of claim 49 wherein said polyol is an aromatic initiator-based polyether polyol.

59. The premixes of claim 49 wherein said polyol is an amine-based polyether polyol.

60. The premixes of claim 50 wherein said polyol is an aromatic-based polyester polyol.

61. The premixes of claim 50 wherein said polyol is a polyethylene terephthalate-based polyester polyol.

* * * * *